UNITED STATES PATENT OFFICE.

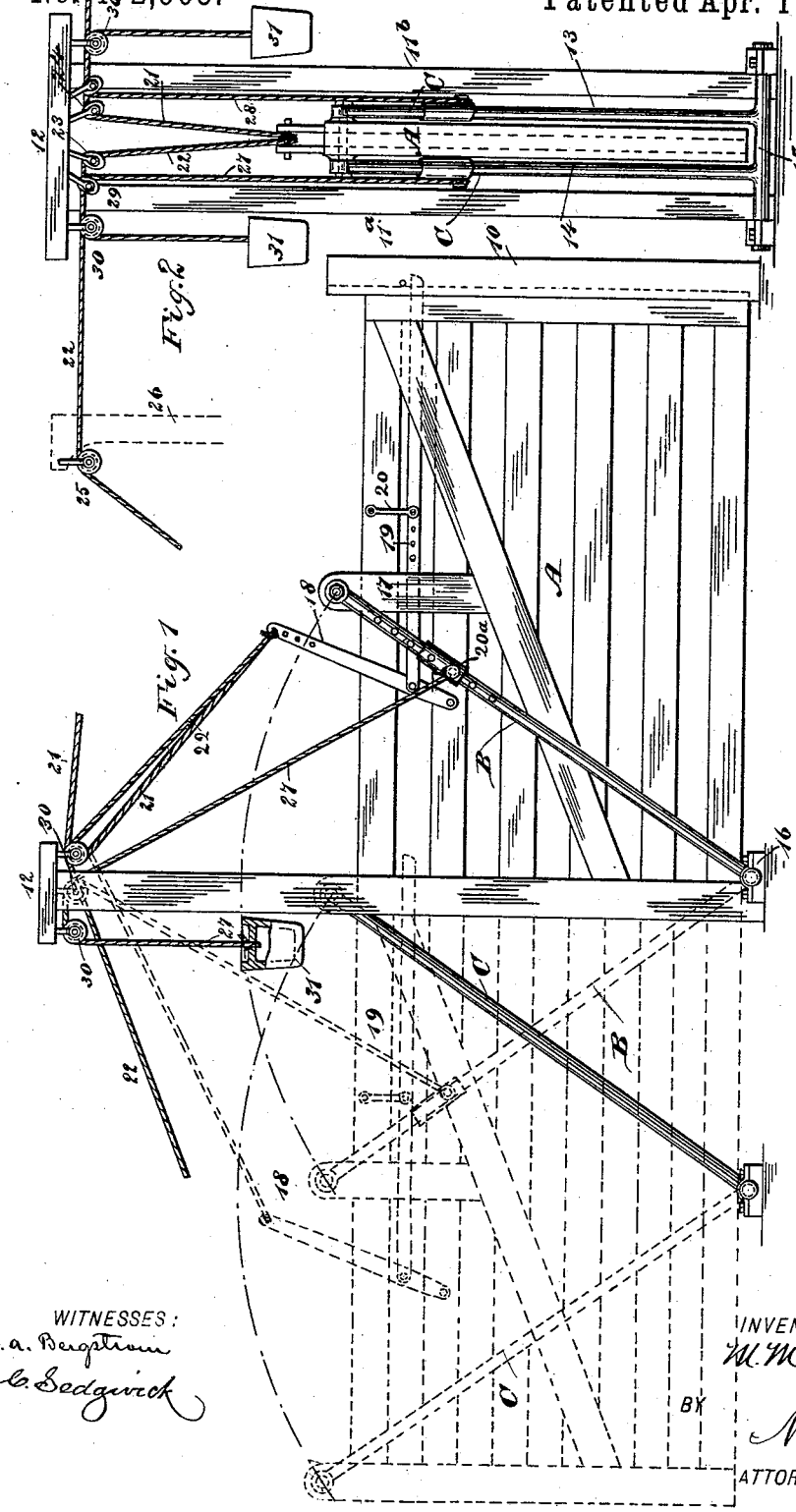

MARTIN McDONOUGH, OF WINCHESTER, ILLINOIS.

GATE.

SPECIFICATION forming part of Letters Patent No. 472,905, dated April 12, 1892.

Application filed December 1, 1891. Serial No. 413,675. (No model.)

*To all whom it may concern:*

Be it known that I, MARTIN McDONOUGH, of Winchester, in the county of Scott and State of Illinois, have invented a new and useful Improvement in Gates, of which the following is a full, clear, and exact description.

My invention relates to an improvement in gates, and has for its object to provide a means whereby a gate may be constructed upon a hillside as well as upon level ground and be positively and conveniently manipulated from either side—that is, opened from one side and closed from the other, or opened or closed from either side.

Another object of the invention is to prevent the sagging of the gate and to provide a means whereby the gate may be opened though located in a snow-drift or in stormy or sleety weather with almost equal facility as in clear weather.

Another object of the invention is to construct a gate capable of the functions above described and made in a simple, durable, and economic manner.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in both the views.

Figure 1 is a side elevation of the gate, illustrating it as closed in positive lines and as open in dotted lines; and Fig. 2 is a rear elevation of the gate.

The body A of the gate may be made in any approved manner. Usually it is formed from a series of slats longitudinally located and connected by suitable braces and by front and rear uprights. The body of the gate is entirely independent of the posts located at its ends—that is, the keeper-post 10 and what is usually termed the "swing" or "hinge" post 11. The latter post comprises two parallel uprights $11^a$ and $11^b$, located so that a space will intervene, through which the body of the gate may pass endwise unobstructed. The uprights $11^a$ and $11^b$, forming the swing or hinge post, are much longer than the keeper-post and are connected at their upper ends by a cross-bar 12, which cross-bar extends preferably beyond the sides of the uprights. The rear end only of the gate-body is located between the uprights $11^a$ and $11^b$ when the gate is in its closed position, and the front end of the gate-body—that end carrying the latch—engages with the keeper-post, which is suitably located to admit of this engagement.

The gate is supported in a horizontal position some little distance above the ground by two levers B and C. These levers are somewhat U-shaped in general contour and comprise two members 13 and 14, connected at their lower ends by a cross-bar 15, the ends of which cross-bar extend beyond the side faces of the upright members. The lower portion of the lever B is pivoted or journaled in suitable bearings 16, located in front of the uprights $11^a$ and $11^b$, as is shown in Fig. 1, one member of the lever passing upward at each side of the gate to a connection with standards 17, one of said standards being attached to the gate at or near the center at each side. These standards extend some little distance beyond the top of the gate-body and are immediately opposite each other. The connection between the members 13 and 14 of the lever B and the standard 17 is a pivotal one. The lever C is journaled at its lower end back of the uprights $11^a$ and $11^b$, the distance between the point where the lever C is journaled and the uprights being practically equal to the distance between the ends of the gate-body and its center. The upper ends of the members of the rear lever C are pivotally connected with the upper rear portion of the gate-body, and when the gate-body is in its closed position the upper ends of the members of this lever are located between the uprights $11^a$ and $11^b$. A latch-lever 18 at its lower end is pivotally attached to the gate-body at the rear of the standards 17, and the inner end of a latch 19 is pivotally attached to this lever above its fulcrum, and the latch is pivotally connected with the gate by a link 20. The upper end of the latch-lever is some distance beyond the top of the gate-body and the movement of the latch-lever is limited by the link 20. The levers B have adjustably located thereon sleeves $20^a$, which sleeves may be adjusted upon said levers by passing pins through the sleeves and through apertures in the levers, as shown in Fig. 1, or set-screws may be employed to clamp the sleeves to the levers. The latch is provided with a series of apertures, whereby it may be adjusted laterally should the keeper-post get out of plumb. The latch-lever normally inclines in direction of the keeper-post, and by reason of this inclination and the manner in which the latch is connected with the gate the latch will drop by gravity when tension is removed from its lever and will assume a proper position to engage with the keeper-post. The lower ends of two cables 21 and 22 are secured to the upper ends of the latch-lever, the attachment being an adjustable one, and these cables are carried over pulleys 23 and 24, suspended from the cross-bar 12 in opposite directions, one cable being carried to each side of the swing or hinge post of the gate; and said cables are further passed over pulleys 25, attached to posts 26, located one at each side of the gate-opening. Two other cables 27 and 28 are connected with the sleeves 20ª upon the levers B. These cables are carried upward over two sets of pulleys 29 and 30, suspended from the cross-bar 12, and thence downward from the pulleys, and to the lower end of each cable 27 and 28 a weight 31 is secured. These weights are adapted to counterbalance the gate-body, and to that end they are made hollow, so that more or less material may be added, as may be found necessary to effect a proper counterbalance. I desire it to be distinctly understood that if in practice it is found desirable but one cable may be attached to a lever B and but one weight may be employed; also, that instead of each of the levers B and C consisting of two members connected at their lower ends, the levers at one side of the gate may be independent of those located at the opposite side.

In the operation of the gate, if it be closed and it is desired to open it, either the cable 21 or 22 is drawn down upon, whereupon the latch-lever 18 will at its upper end be drawn inward or in the direction of the swing-post, which movement of the latch-lever will free the latch from engagement with the keeper-post and the gate will rise upward, supported by the levers B and C and counterbalanced by the weights 31, and will swing backward, carried by the levers, and pass horizontally rearward between the uprights 11ª and 11ᵇ, and will drop downward to the same position at the back of these uprights that it formerly sustained in front thereof, as shown in positive and in dotted lines, Fig. 1. As the gate is counterbalanced by the weights, but little exertion is required in the manipulation of either cable 21 or 22 to raise the gate and reverse the position of the levers B and C. After passing through the opening between the gate-posts the cable leading downward from the post 26 at the opposite side of the opening is drawn down upon, and the gate will thereby be restored to its normal or closed position, and the latch will enter the keeper in the post 10 and the gate-body will be thereby locked. The gate may be raised or lowered very readily by grasping the latch and exerting an upward pressure upon the gate-body or by moving either of the levers B.

It will be observed that the gate and its attachments are exceedingly simple, and that as the gate rides upon the levers B and C in a horizontal position from its closed to its open position, and vice versa, any snow or sleet that may have accumulated upon the ground will not interfere with the proper manipulation of the gate. It is also obvious that the lifting power of the weights 31 may be regulated as required by adjusting the sleeves 20ª upon the levers B.

Having thus described my invention, I claim as new and desire to secure by Letters Patent—

1. The combination, with the gate, of the swinging levers B C, pivoted at their upper ends to the gate, the lever B being provided with an adjustable sleeve, and a weighted cord or cable secured to said sleeve and passing over an elevated guide, substantially as set forth.

2. The combination, with the gate and its latch and operating ropes or cables, of the swinging levers B C, pivoted at their upper ends to the gate, the forward lever B having a series of apertures and a sliding sleeve, a transverse pin passed through the sleeve and any of said apertures, and the counterbalancing-weight having a cord or cable connected with the adjustable sleeve, substantially as set forth.

MARTIN McDONOUGH.

Witnesses:
JOHN W. YOST,
F. A. HUBBARD.